(12) United States Patent
Das et al.

(10) Patent No.: US 10,492,233 B2
(45) Date of Patent: Nov. 26, 2019

(54) SYSTEM AND METHOD FOR SWITCHING FREQUENCIES IN A WIRELESS ACCESS SOLUTION BASED ON DYNAMIC SPECTRUM ALLOCATION

(71) Applicant: Federated Wireless, Inc., Arlington, VA (US)

(72) Inventors: Deepak Das, Lexington, MA (US); Sarath Padakandla, Herndon, VA (US)

(73) Assignee: Federated Wireless, Inc., Arlington, VA (US)

( * ) Notice: Subject to any disclaimer, the term of this patent is extended or adjusted under 35 U.S.C. 154(b) by 247 days.

(21) Appl. No.: 15/150,145

(22) Filed: May 9, 2016

(65) Prior Publication Data

US 2016/0330743 A1 Nov. 10, 2016

Related U.S. Application Data

(60) Provisional application No. 62/158,959, filed on May 8, 2015, provisional application No. 62/163,624, filed
(Continued)

(51) Int. Cl.
*H04W 72/04* (2009.01)
*H04W 76/10* (2018.01)
(Continued)

(52) U.S. Cl.
CPC ........ *H04W 76/10* (2018.02); *H04B 7/18523* (2013.01); *H04L 12/14* (2013.01);
(Continued)

(58) Field of Classification Search
CPC ... H04W 76/02; H04W 76/046; H04W 48/06; H04W 88/08; H04L 41/5051; H04L 12/66; H04L 41/5096
See application file for complete search history.

(56) References Cited

U.S. PATENT DOCUMENTS

2004/0203429 A1* 10/2004 Anderson ............. H04W 64/00
455/67.11
2005/0003827 A1* 1/2005 Whelan ................. H04W 16/10
455/454

(Continued)

*Primary Examiner* — Christine Ng
(74) *Attorney, Agent, or Firm* — Finnegan, Henderson, Farabow, Garrett & Dunner, LLP

(57) ABSTRACT

The disclosed embodiments include methods, systems, articles of manufacture, and access devices configured to switch frequencies in a wireless access network. The techniques described in the disclosed embodiments may be used to facilitate efficient switching of frequencies in a dynamic spectrum environment. In one aspect, the disclosed embodiments may be implemented in a Long Term Evolution access network. The disclosed embodiments receive, by an access device, information allocating at least one frequency channel to be used by the access device. The disclosed embodiments also transmit, to one or more user equipment connected to the access device, an instruction for directing the one or more user equipment to look a first frequency channel. As a result, the disclosed embodiments allow efficient switching of frequencies even if the spectrum may be allocated dynamically.

39 Claims, 14 Drawing Sheets

Related U.S. Application Data on May 19, 2015, provisional application No. 62/163,743, filed on May 19, 2015, provisional application No. 62/164,949, filed on May 21, 2015, provisional application No. 62/165,018, filed on May 21, 2015.

(51) Int. Cl.

| | | |
|---|---|---|
| *H04L 29/08* | (2006.01) | |
| *H04W 12/06* | (2009.01) | |
| *H04W 76/27* | (2018.01) | |
| *H04W 48/06* | (2009.01) | |
| *H04W 48/16* | (2009.01) | |
| *H04L 12/66* | (2006.01) | |
| *H04L 12/931* | (2013.01) | |
| *H04M 15/00* | (2006.01) | |
| *H04W 4/24* | (2018.01) | |
| *H04B 7/185* | (2006.01) | |
| *H04W 56/00* | (2009.01) | |
| *H04L 12/24* | (2006.01) | |
| *H04W 12/08* | (2009.01) | |
| *H04W 4/60* | (2018.01) | |
| *H04L 12/14* | (2006.01) | |
| *H04W 88/08* | (2009.01) | |
| *H04W 84/20* | (2009.01) | |
| *H04L 29/12* | (2006.01) | |

(52) U.S. Cl.
CPC .......... *H04L 12/66* (2013.01); *H04L 41/5051* (2013.01); *H04L 49/70* (2013.01); *H04L 67/02* (2013.01); *H04L 67/10* (2013.01); *H04L 67/142* (2013.01); *H04L 67/22* (2013.01); *H04M 15/55* (2013.01); *H04M 15/66* (2013.01); *H04W 4/24* (2013.01); *H04W 4/60* (2018.02); *H04W 12/06* (2013.01); *H04W 12/08* (2013.01); *H04W 48/06* (2013.01); *H04W 48/16* (2013.01); *H04W 56/0015* (2013.01); *H04W 76/27* (2018.02); *H04L 41/5087* (2013.01); *H04L 41/5096* (2013.01); *H04L 61/1505* (2013.01); *H04W 84/20* (2013.01); *H04W 88/08* (2013.01)

(56) References Cited

U.S. PATENT DOCUMENTS

| | | | |
|---|---|---|---|
| 2005/0096016 A1* | 5/2005 | Tervo | H04L 67/16 455/414.1 |
| 2007/0097912 A1* | 5/2007 | Kawaguchi | H04W 72/06 370/329 |
| 2007/0287464 A1* | 12/2007 | Hamamoto | H04L 5/06 455/447 |
| 2011/0099595 A1* | 4/2011 | Lindquist | H04N 21/4383 725/105 |
| 2012/0176963 A1* | 7/2012 | Vashi | H04W 76/18 370/328 |
| 2014/0078885 A1* | 3/2014 | Koskinen | H04W 36/30 370/216 |
| 2015/0085762 A1* | 3/2015 | Matin | H04W 24/02 370/329 |
| 2015/0188592 A1* | 7/2015 | Solondz | H04B 1/3888 455/501 |
| 2016/0094965 A1* | 3/2016 | Sennett | H04W 4/90 455/404.1 |
| 2017/0033912 A1* | 2/2017 | Onggosanusi | H04B 7/0626 |

* cited by examiner

SYSTEM AND METHOD FOR SWITCHING FREQUENCIES IN A WIRELESS ACCESS SOLUTION BASED ON DYNAMIC SPECTRUM ALLOCATION

CROSS-REFERENCE TO RELATED APPLICATIONS

This application claims the benefits of U.S. Provisional Application Ser. No. 62/158,959, filed May 8, 2015, U.S. Provisional Application Ser. No. 62/163,624, filed May 19, 2015, U.S. Provisional Application Ser. No. 62/163,743, filed May 19, 2015, U.S. Provisional Application Ser. No. 62/164,949, filed May 21, 2015, and U.S. Provisional Application Ser. No. 62/165,018, filed May 21, 2015, which are each hereby incorporated by reference in their entireties.

FIELD OF INVENTION

The present invention generally relates to wireless access systems having dynamic spectrum allocation, and more particularly to systems, methods, and apparatuses for switching frequencies in a wireless access infrastructure.

BACKGROUND

The proliferation of smartphones and other wireless devices has led to ever-increasing demand for wireless spectrum. In an effort to ameliorate this problem, the U.S. Federal Communications Commission (FCC) has established a shared-spectrum service in the 3550 to 3700 MHz band (i.e., 3.5 GHz band). This band has been traditionally reserved by the U.S. Department of Defense for military use, for example, by military radars on navy ships. The FCC has recently made the 3.5 GHz band available for a commercial radio service called Citizens Broadband Radio Service (CBRS). Because the spectrum is shared, some mechanism must be adopted to ensure users within the same spectrum do not interfere with each other, and that users with higher priorities have guaranteed access to the spectrum in a situation of a conflict.

Using the 3.5 GHz band as an example, a three-tiered model has been proposed and adopted by the FCC in an effort to protect existing users of the band, as illustrated in FIG. 1. As shown in the figure, the top tier belongs to incumbent access (IA) users, such as federal and non-federal incumbent systems, who have the highest priority to use the 3.5 GHz band. Between the incumbent users and non-incumbent users (typically public users) are one or more Spectrum Access Systems (SAS), which coordinate and facilitate spectrum sharing among all of the users in the band. Then among the public users, some may obtain higher Priority Access (PA) under a Priority Access License (PAL), while others may operate without a license under General Authorized Access (GAA), GAA users have the lowest priority within the allocation.

The SAS may facilitate efficient spectrum allocation among the three tiers shown in FIG. 1 by ensuring that communications from wireless devices ("user equipment" or "UE") in a lower-priority access tier do not interfere with communications of those in a higher-priority tier. The SAS may accomplish this by monitoring interference and frequency usage in the shared spectrum, and dynamically allocate frequencies for devices to use within the spectrum.

In this context, a "frequency" broadly refers to a frequency band, a frequency channel, a frequency within a band or channel, or a signal at a particular frequency (such as a carrier signal), and unless otherwise noted these terms may be used interchangeably. A "connection" broadly refers to any communication of information, such as voice and/or data, between devices using one or more frequencies. "Spectrum" broadly refers to frequencies that may be used to establish connections.

The SAS coordinates and manages spectrum sharing among the incumbents, PAL systems, and GAA systems, by dynamically allocating spectrum to the PAL and GAA user-equipment devices. However, current PAL and GAA devices are not designed to dynamically switch frequency channels during an ongoing connection in the wireless access system. Thus, anytime the SAS allocates new frequency channels for the PAL or GAA devices to use in the shared spectrum, these devices may not be able to switch frequency channels efficiently, quickly, or smoothly with minimal disruption to the end user's experience. Moreover, the three-tiered model may pose significant challenges to lower-priority users when they must discontinue using a frequency so it may be used by higher-priority users, for example during emergencies, or in other situations of conflict with higher-priority users, with little to no warnings.

SUMMARY

The disclosed embodiments include methods, systems, and apparatuses, including access devices, configured to switch frequencies in a wireless access system. The techniques in the disclosed embodiments may be used to facilitate efficient switching of frequencies in a dynamic spectrum environment, such as a wireless access network comprising one or more SASs. In some disclosed embodiments, the wireless access system may comprise a Long Term Evolution (LTE) network.

In accordance with the disclosed embodiments, an access device, such as a wireless access point, wireless router, base station, or integrated access point, may receive information, for example from a SAS, allocating at least one frequency channel over which the access device may communicate with one or more user equipments (UEs). In some disclosed embodiments, the access device may determine one or more of its allocated frequency channels to use in establishing connections with the UEs.

Further to the disclosed embodiments, the access device may transmit a message to the one or more UEs indicating the at least one allocated frequency channel. The access device also may configure a radio to operate using one or more of the allocated frequency channels. For example, the access device may configure both a transmitter and a receiver in the radio to operate using the at least one allocated frequency channel. In some disclosed embodiments, the access device may transmit a message indicating the at least one allocated frequency channel to the one or more UEs before configuring a radio to operate at the allocated frequency channel(s). In some embodiments, the message may direct the one or more UEs to temporarily discontinue at least one existing connection with the access device during a time period when the access device's radio is being configured. In some disclosed embodiments, the access device may transmit to the one or more UEs a message indicating at least one allocated frequency channel using a RRC-Reconfiguration message from the LTE standard. In yet other disclosed embodiments, the RRC-Reconfiguration message may indicate the one or more allocated frequency channels and also include other information related to the frequency channels. In yet other disclosed embodiments, the access device may transmit to the one or more UEs a message using a RRC-Connection-Release message from the LTE standard. The disclosed embodiments may establish a connection between the access device and the one or more UEs based on the at least one allocated frequency channel.

While the disclosed embodiments are described in the context of an access device in communication with one or more UEs in a wireless access system, persons of ordinary skill in the art will appreciate that the invention is not limited to the illustrative embodiments and may be performed using other wireless access systems and devices that facilitate switching of frequencies in accordance with the teachings herein. It is to be understood that both the foregoing general description and the following detailed description are exemplary and explanatory only, and are not restrictive of the disclosed embodiments as defined in the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

Reference will now be made in detail to exemplary disclosed embodiments, examples of which are illustrated in the accompanying drawings and disclosed herein. Where convenient, the same reference numbers will be used throughout the drawings to refer to the same or like parts.

DETAILED DESCRIPTION

The disclosed embodiments provide systems, methods, and apparatuses for switching frequencies in a wireless access solution using a dynamic spectrum allocation scheme. The disclosed embodiments allow efficient switching of frequencies in the shared spectrum with minimal disruption to end users using the shared spectrum.

Figure 1:
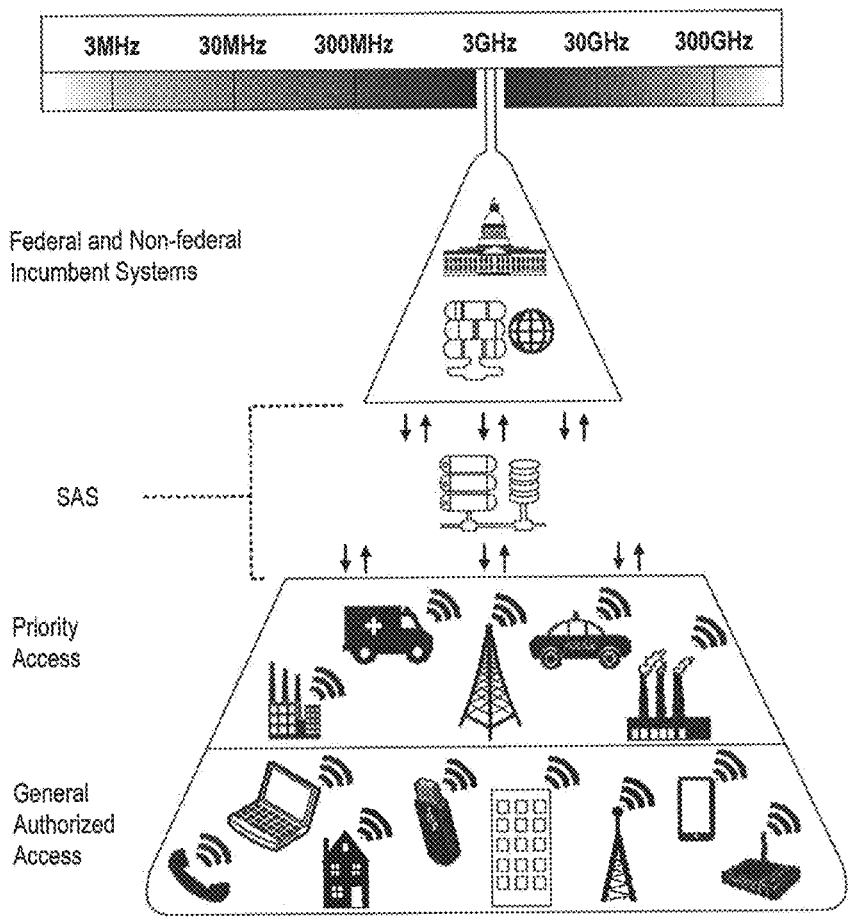
FIG. 1, previously described, is a schematic diagram illustrating a three-tiered spectrum-sharing model adopted by the FCC.
Figure 2:
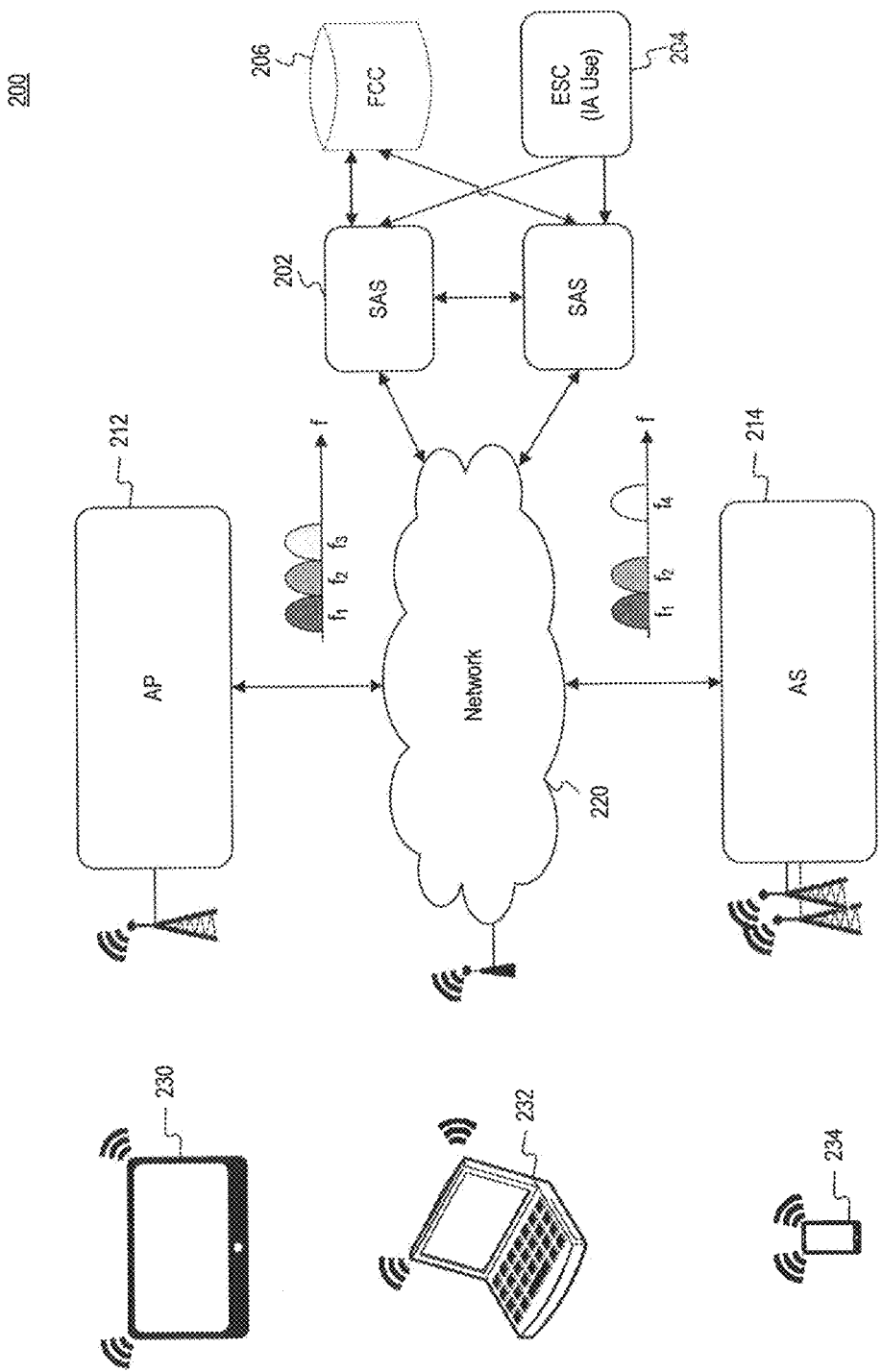
FIG. 2 is a schematic diagram of an exemplary shared-spectrum system for implementing methods and systems in accordance with the disclosed embodiments.

FIG. 2 is a schematic diagram of an exemplary shared-spectrum system 200 in accordance with the disclosed embodiments. The system 200 may comprise one or more UEs 230, 232, and 234. The UEs may include, for example, smartphones, laptops, tablets, and any other computer systems or devices that support wireless communications. Each UE may be an incumbent access ("IA"), PA, or GAA device depending on whether its end user is an incumbent-access, priority-access, or general-authorized-access user.

The system 200 also may include one or more SASs 202 that allocate frequencies in a shared spectrum for use by IA, PA, and GAA devices. The SASs may dynamically assign frequencies for use by each of the UEs 230, 232, and 234, for example, based on their relative priority levels and/or frequency usages in system 200.

In some embodiments, the system 200 may include an Environmental Sensing Capability system (ESC) 204 configured to detect the presence and/or frequency usage of higher-priority IA devices. The ESC communicates information relating to IA devices to the SASs 202, thereby facilitating the SASs with allocating frequencies based on priority levels. In some aspects, the system 200 may also implement exclusion and/or protection zones in which the IA devices may operate with reduced interference. In some embodiments, the system 200 may include one or more FCC databases 206 configured to store information related to PAL devices. The SASs 202 may access the database(s) 206 to ensure PAL devices within a specific geographic service area experience less interference from GAA devices.

As shown in FIG. 2, the shared-spectrum system 200 may include one or more access points (AP) 212 and one or more access systems (AS) 214. Each AP and AS may communicate with the SASs 202 via a network 220. In some embodiments, the AP 212 and AS 214 may be deployed by PAL and GAA operators or licensees within their respective communications systems. The AP 212 may be used to enable UEs to communicate with other UEs within the system 200, and also may serve as a gateway for communications to other UE devices in network 220 and UE devices in other networks accessible through network 220. Each AP 212 may serve multiple end users and their respective UEs 230, 232, and 234. The AS 214 generally describes any access networking system, and may include one or more of its own APs 212 (not shown in AS 214). The AP 212 and AS 214 may communicate with UEs configured for use as one or more of IA, PA, and/or GAA priority-level devices.

In a further aspect of the disclosed embodiments, the AP 212 and AS 214 may include one or more transmitters and receivers configured to send and receive signals in a predetermined frequency band, such as the CBRS band. In another aspect, the AP 212 and AS 214 may utilize any suitable wireless communication technologies or protocols, including but not limited to LTE, Wideband Code Division Multiple Access (WCDMA), Global System for Mobile Communications (GSM), among others, to communicate with UEs 230, 232, 234.

Network 220 may comprise one or more interconnected wired or wireless networks, including public and/or private networks, and generally may comprise any type of computer networking arrangement. For example, the network 220 may be implemented using the Internet, a wired Wide Area Network (WAN), a wired Local Area Network (LAN), a wireless WAN (e.g., WiMAX), a wireless LAN (WLAN) (e.g., IEEE 802.11, Bluetooth, etc.), a private data network, a virtual private network using a public network, and/or other suitable connection (e.g., Near Field Communications (NFC), infrared, optical, etc.) that enables the system 200 to send and receive information between components in the system 200.

In accordance with the disclosed embodiments, the SASs 202 may dynamically allocate frequency channels to the AP 212 and/or AS 214. The frequency allocation for an AP or AS, for instance, may be a contiguous span of frequency channels (e.g., $f_1$, $f_2$, $f_3$), or alternatively may be non-contiguous set of frequency channels (e.g., $f_1$, $f_2$, $f_4$), as shown in FIG. 2. In some cases, the SASs 202 may allocate one or more of the same frequency channels to different APs 212 and/or ASs 214, Each AP 212 and AS 214 may select from among its allocated channels the most-suitable frequency channel to use with a UE, for example, based on environmental conditions, load balancing, interference levels, resource usage, or any other optimization criteria.

For example, if the one or more SASs 202 allocate a frequency channel to both the AP 212 and AS 214, the AP and AS may choose to use that frequency channel at the same time, which may improve UE mobility within the system 200. In other embodiments, the AP 212 and AS 214 may use different frequency channels. While this type of deployment may create challenges for UE mobility, it may allow redundancy and graceful transition of frequency channels. Redundant deployment occurs when different frequency channels simultaneously cover the same deployment area. In yet another aspect, the SASs 202 may allocate different frequency channels.

In some disclosed embodiments, such as in a LTE deployment in the system 200, the AP 212 and AS 214 may simultaneously use multiple frequency channels. In the context of LTE, this is referred to as "carrier aggregation." Using a carrier-aggregation mode, the AP 212 and AS 214 may select specific frequency carriers and a number of carriers to aggregate based on their frequency-channel assignments from the one or more SASs 202.

Figure 3:
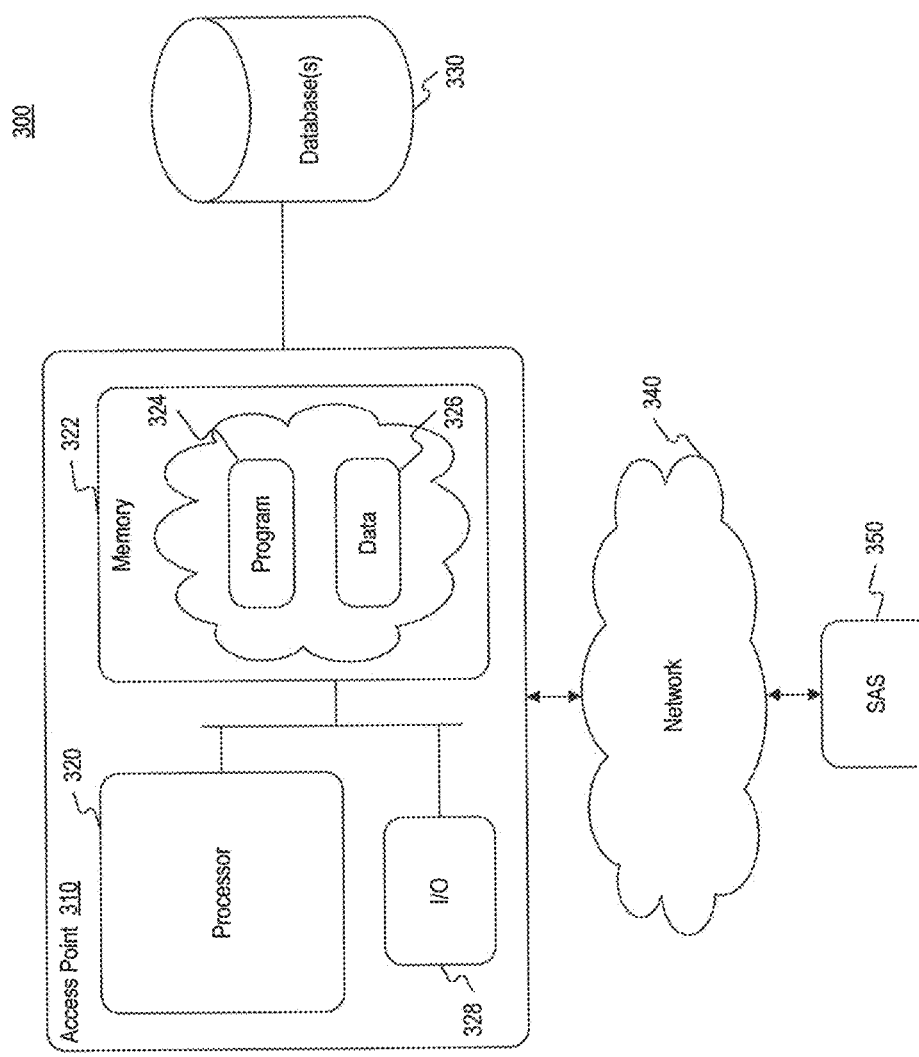
FIG. 3 is a schematic diagram of an exemplary access point that may be used in a shared-spectrum system in accordance with the disclosed embodiments.

FIG. 3 is a schematic diagram of an exemplary shared-spectrum system 300 in accordance with the disclosed embodiments. The system 300, or variations thereof, may be used to implement components in the system 200, including for example at least one of the AP 212 and AS 214. The system 300 may include at least one AP 310 including one or more processors 320, one or more memories 322, and one or more I/O devices 328. The AP 310 may be a mobile computing device, general-purpose computer, a mainframe computer, or any other wireless computing device. In some embodiments, the AP 310 may be implemented in a macrocell base station or tower, or alternatively, may be implemented in a small cell base station including but not limited to microcells, picocells, femtocells, or the like. In yet other embodiments, the AP 310 may be implemented as a stand-alone device or as a system-on-a-chip (SoC). Thus, the AP 310 may be a stand-alone system, or it may be implemented as a subsystem in a larger system, where one or more operations in the system 300 are performed using parts of the larger system.

Processor 320 may include one or more known processing devices. For example, the processor may be from the family of processors manufactured by Intel, Broadcom, Cavium, Freescale, TI, Qualcomm, or the like. In some embodiments, the processor may be based on the ARM architecture, MIPS architecture, or may employ any other processor architecture. In some embodiments, the processor may be a mobile processor or may be implemented in an SoC. The disclosed embodiments are not limited to any type of processor configured in AP 310.

Memory 322 may include one or more storage devices configured to store software instructions used by the processor 320 to perform functions related to the disclosed embodiments. For example, the memory 322 may be configured to store software instructions, such as program(s) 324, that perform one or more operations when executed by the processor(s) 320. The disclosed embodiments are not limited to software programs or devices configured to perform dedicated tasks. For example, the memory 322 may include a single program 324, such as a SAS-client application, that performs the functions of the disclosed embodiments, or may comprise multiple software programs. Additionally, the processor 320 may execute one or more programs (or portions thereof) remotely located from the AP 310. For example, the AP 310 may access one or more remote software applications via the network 340, such that, when executed, the remote applications perform at least some of the functions related to the disclosed embodiments. Furthermore, the memory 322 also may be configured to store data 326, for example, for use by the software program(s) 324.

The I/O devices 328 include one or more radio-frequency (RF) transmitters and one or more RF receivers configured to send and receive wireless communications. The transmitter and receiver may be implemented as a single transceiver, or alternatively may be separately implemented in the AP 310. The AP may use a "radio" comprising an RF transmitter and receiver to communicate with the one or more UEs 230, 232, and 234, for example, using any suitable wireless communication technologies or protocols, including but not limited to WiFi (IEEE 802.11), WiMAX (IEEE 802.16), LTE, WCDMA, GSM, among others. Each of the transmitters and receivers in the AP 310 may be tunable, programmable, and/or reconfigurable to communicate over one or more desired frequency channels. For example, the I/O devices 328 may include a RF transmitter that transmits wireless signals over a first frequency channel and a RF receiver that receives wireless signals over a second frequency channel, which may be the same or different than the first frequency channel.

AP 310 also may be communicatively coupled to one or more databases 330. The database 330 may include one or more memory devices that store information and are accessed and/or managed through the AP 310. The disclosed embodiments, however, are not limited to separate databases. In one aspect of the disclosed embodiments, the AP 310 may implement the database 330. In another aspect, the database 330 may be located remotely from the AP 310. Moreover, the database 330 may include various computing components (e.g., database management system, database server, etc.) configured to receive and process requests for data stored in the memory devices of the database 330 and provide data retrieved from the database 330. In some embodiments, the AP 310 may be configured to access an Operation, Administration & Management (OA&M) server, a Network Management Server (NMS), an Element Management Server (EMS), or the like, which in turn may be configured to have access to the database 330.

In some embodiments, the AP 310 may maintain a list of neighbor relations, for example, which may be stored as data 326 or in the database 330. In one aspect of the disclosed embodiments, the list of neighbor relations may include information related to other APs and/or ASs ("neighbors") in the system 200, and may also identify frequency channels used by or allocated to those other APs or ASs, for example, to use in a potential hand-off process. In another aspect, the neighbor relations list may contain all the different frequency channels allocated in the shared spectrum system 200. The AP 310 may obtain the list of frequencies allocated to neighboring APs and ASs, for example, by direct communications with the SAS 350 or by using the UEs 230, 232, 234 to assess which frequency channels they are configured to communicate in the system 200.

It is to be understood that the configurations and boundaries of the functional building blocks shown for exemplary systems 200 and 300 have been arbitrarily defined herein for the convenience of the description. Alternative implementations may be defined so long as the specified functions and relationships thereof are appropriately performed and fall within the scope and spirit of the invention.

Figure 4:
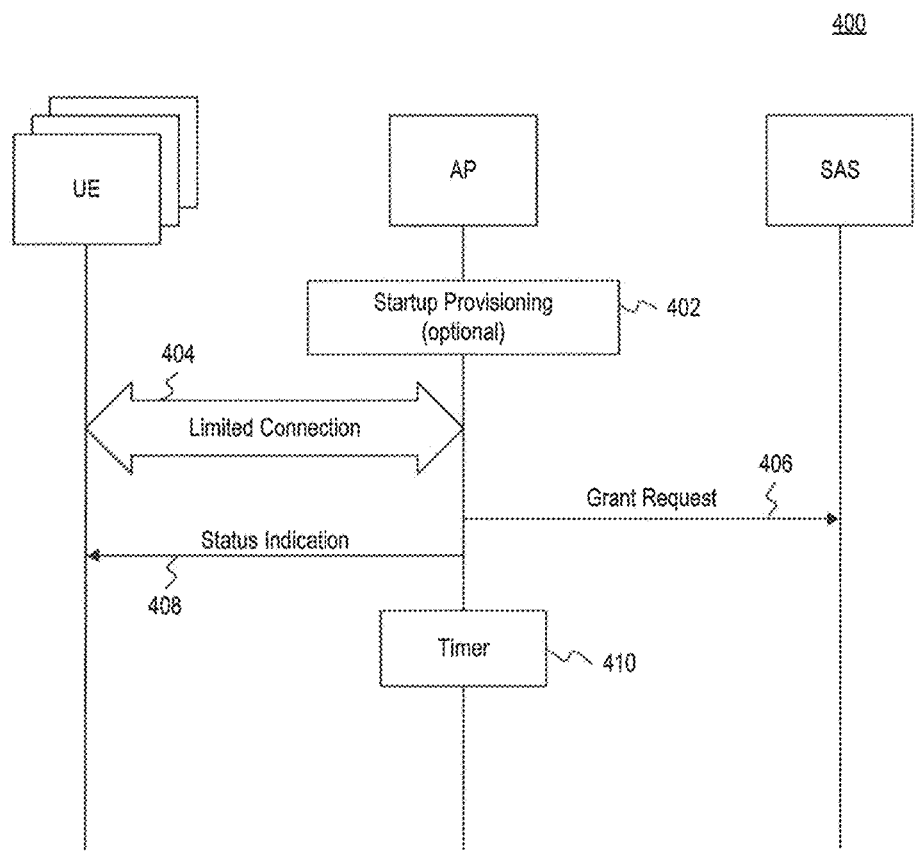
FIG. 4 is a flow diagram illustrating an exemplary sequence of steps that may be performed during initialization of an access point in accordance with the disclosed embodiments.

FIG. 4 is a flow diagram illustrating an exemplary sequence of steps that may be performed during initialization of an AP in accordance with the disclosed embodiments. The process of FIG. 4 may be implemented in software, hardware, or any combination thereof. For purposes of explanation and not limitation, the process 400 will be described in the context of system 200, such that the disclosed process may be performed by software executing in the SAS 202, AP 212, and/or AS 214.

In some embodiments, the AP 212 during startup may determine an initial frequency channel for transmission before receiving its first channel assignment from the SAS 202. For example, the AP 212 may perform an optional startup provisioning process 402 to select an initial frequency channel. In such an embodiment, the initially-selected channel may be predetermined as a default channel within the shared spectrum. Alternatively, the AP 212 may assess the allocated channels of the neighboring APs to determine a suitable frequency channel to select.

Once the AP 212 has selected an initial frequency channel, the AP 212 may establish a connection 404 with a UE. In one aspect of the disclosed embodiments, this initial connection 404 may permit only limited transmissions between the AP and UE (e.g., basic signaling). In another aspect, the initial connection 404 may be used for communicating emergency services, for example, including but not limited to government alerts such as AMBER alerts, weather alerts, crime alerts, or other emergency alerts, or other emergency services such as providing emergency channel allocations to IA or PAL devices. The AP 212 may establish the limited connection 404 before transmitting a grant request 406 for a channel assignment to the SAS 202. In other embodiments where the AP 212 does not perform such an optional startup provisioning, AP 212 may proceed directly to transmitting the request 406 to SAS 202.

In one embodiment, the AP 212 may further provide a status indication 408 to the UEs as it awaits receiving its frequency allocations from the SAS 202. For example, the status indication 408 may enable the AP 212 to provide channel assignment state to the UEs. In some embodiments, the AP 212 may implement one or more timers 410 to trigger further actions if it does not received its channel allocations before a timer 410 expires. After expiration of the one or more timers 410, the AP 212, for example, may flag or otherwise record the unavailability of channel assignments from the SAS 202 and log the event. Then, the AP 212 may re-request channel assignments from the SAS 202, switch to a standby mode, maintain its current channel, or perform other actions.

Figure 5:
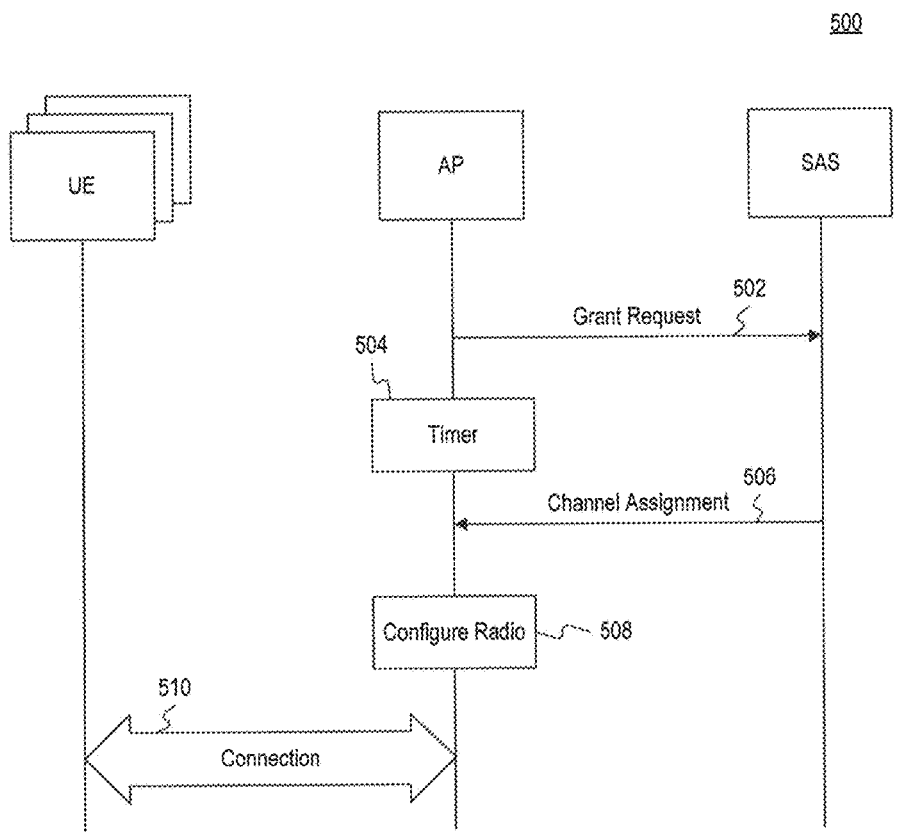
FIG. 5 is a flow diagram illustrating an exemplary sequence of steps that may be performed for allocating frequencies to an access point in accordance with the disclosed embodiments.

FIG. 5 is a flow diagram illustrating an exemplary sequence of steps that may be performed in accordance with the disclosed embodiments. The process of FIG. 5 may be implemented in software, hardware, or any combination thereof. For purposes of explanation and not limitation, the process 500 will be described in the context of system 200, such that the disclosed process may be performed by software executing in the SAS 202, AP 212, and/or AS 214.

In some embodiments, the AP 212 may send a grant request 502 to the SAS 202. Specifically, an SAS client program executing in the AP 212 may send the grant request 502 to the SAS 202 to request a channel allocation. As discussed relative to exemplary process 400, the AP 212 may initiate one or more timers 504 to determine whether to re-send the grant request 502 or perform any other actions.

In response to the grant request 502, the SAS 202 may grant a channel assignment 506 to the AP 212 based on, for example, the availability of frequency channels in system 200, the usage requirements of IA, PA, and GAA devices in the system, and/or quality of service (QoS) or other priority-access determinations. The channel-assignment grant may specify, for example, the start time for the grant, the duration for which the grant is valid, and a list of one or more channel frequencies to be used during the grant period, among other things. Depending on the availability of the channels, the one or more channel frequencies identified in the grant 506 may be a set of contiguous or non-contiguous channels. In some embodiments where the shared spectrum comprises multiple frequency bands, the assignment may be intra-band, inter-band, or any combination of available channels within the shared spectrum.

After the AP 212 receives the channel assignment 506, it may terminate any unexpired timers 504 or may simply ignore the timers 504 because the grant request has led to a successful channel assignment from the SAS 202. In a further aspect of the disclosed embodiments, the AP 212 may initiate one or more new timers to track the start of the grant period, the duration of the grant period, and/or the expiration of the grant period, etc.

At the start of the grant period identified with the channel assignment 506, the AP 212 may configure its radio according to the channel assignment as shown in step 508. Because the channel assignment 506 may contain multiple channels, the AP 212 may have the ability to select the most suitable frequency channel for its QoS needs and/or other optimization criteria. For example, the SAS 202 may have allocated channels $f_1, f_3, f_5$ to the AP 212. In this example, the AP 212 may select the most suitable channel based its current QoS needs. For example, the AP 212 may compare its transmission channel for the existing grant period and the channels allocated for the next grant period. In the situation where the current transmission channel overlaps with the new channel allocation, the AP 212 may maintain the current transmission channel to avoid having to switch frequencies.

Figure 14A:
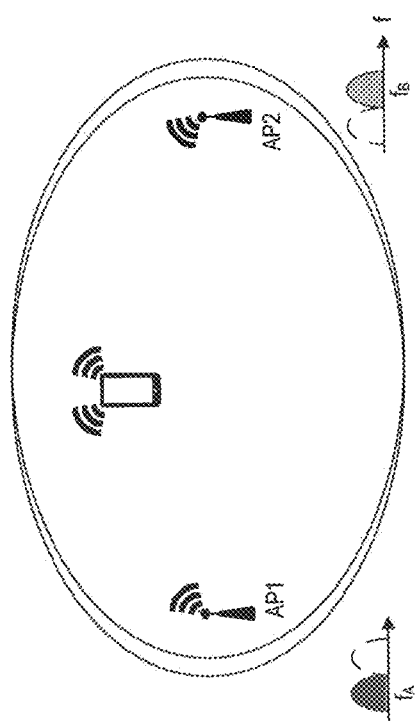
FIGS. 14a-b are schematic diagrams illustrating exemplary wireless network topologies that may be used in accordance with the disclosed embodiments.

In another aspect, the AP 212 may select the most suitable channel based on various optimization criteria. Further to the above example, the neighbor relations list for AP 212 may indicate that AS 214 has been allocated frequency channels $f_1$, $f_3$, $f_6$ and is currently transmitting using channel $f_3$. By way of further example, in a redundant deployment scheme the AP 212 may have information that the entire deployment area can be simultaneously covered by the frequency channels $f_1$ and $f_3$. Thus, the AP 212 may select to use frequency channel $f_1$ as the most suitable channel for purposes of providing redundancy within the system 200. Additional details related to an exemplary redundant deployment are illustrated in FIG. 14*a*. As shown in FIG. 14*a*, the entire deployment area simultaneously may be covered by channels $f_A$ and $f_B$. Thus, the AP1 and AP2 in FIG. 14*a* may select different channels to provide redundancy.

Figure 14B:
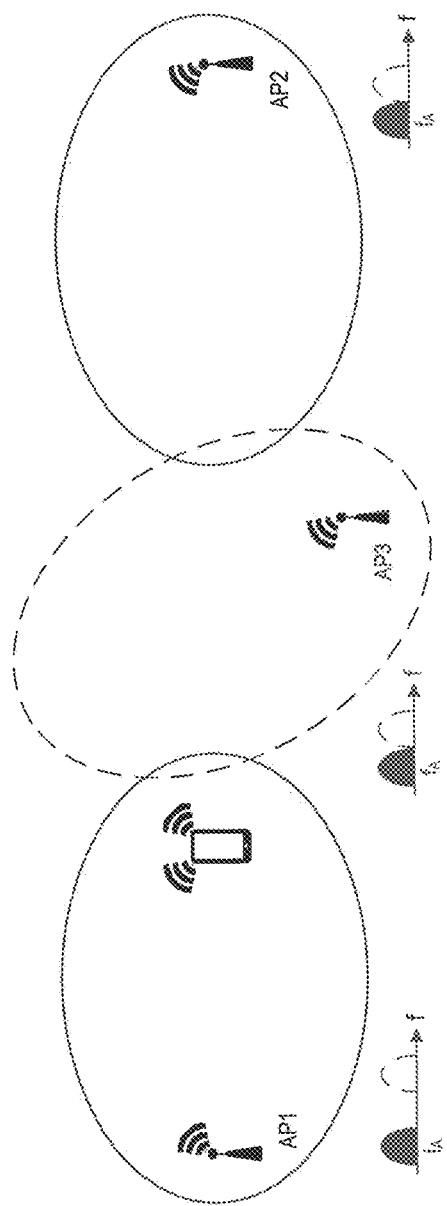

In another aspect of the disclosed embodiments, the optimization criteria implemented in AP 212 may be used to prevent gaps in the coverage areas as illustrated in FIG. 14*b*. In such an aspect, AP3 of FIG. 14*b* may select the same frequency channel $f_A$ as the other access points AP1 and AP2 to fill the coverage gap with the same operating frequency and ensure that UE mobility is not affected, e.g., should the UE move out of the coverage range of AP1 and into the coverage range of AP3. Other optimization criteria may be possible, and the disclosed embodiments are not limited to the examples discussed above or shown in FIGS. 14*a* and 14*b*.

In some embodiments where the AP 212 may simultaneously use multiple frequency channels, such as in carrier aggregation mode in LTE, the AP 212 may select which channels to aggregate and how many channels to aggregate from the channel assignment it receives in the channel assignment grant 506. In some embodiments, the AP 212 may be able to use all of the allocated frequency channels for transmitting over a carrier-aggregated connection.

Figure 13:
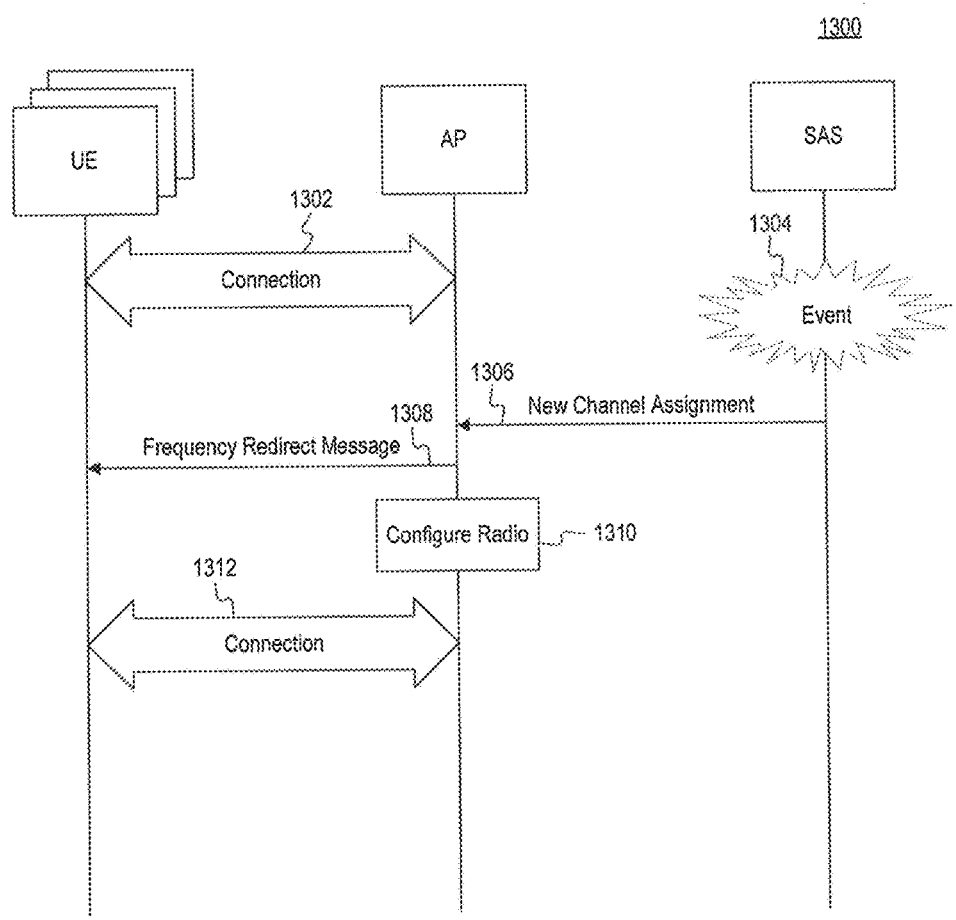
FIG. 13 is a flow diagram illustrating an exemplary sequence of steps that may be performed for switching a frequency of a connection between a user equipment and an access point based on one or more events in accordance with the disclosed embodiments.

In order to dynamically allocate the spectrum, the SAS 202 generally may wait for the AP 212 to initiate the grant request as described in exemplary process 500. However, in some embodiments, the SAS 202 may also initiate the channel assignment without having received a grant request from the AP 212. Additional details related to such embodiments are illustrated in FIG. 13.

Figure 6:
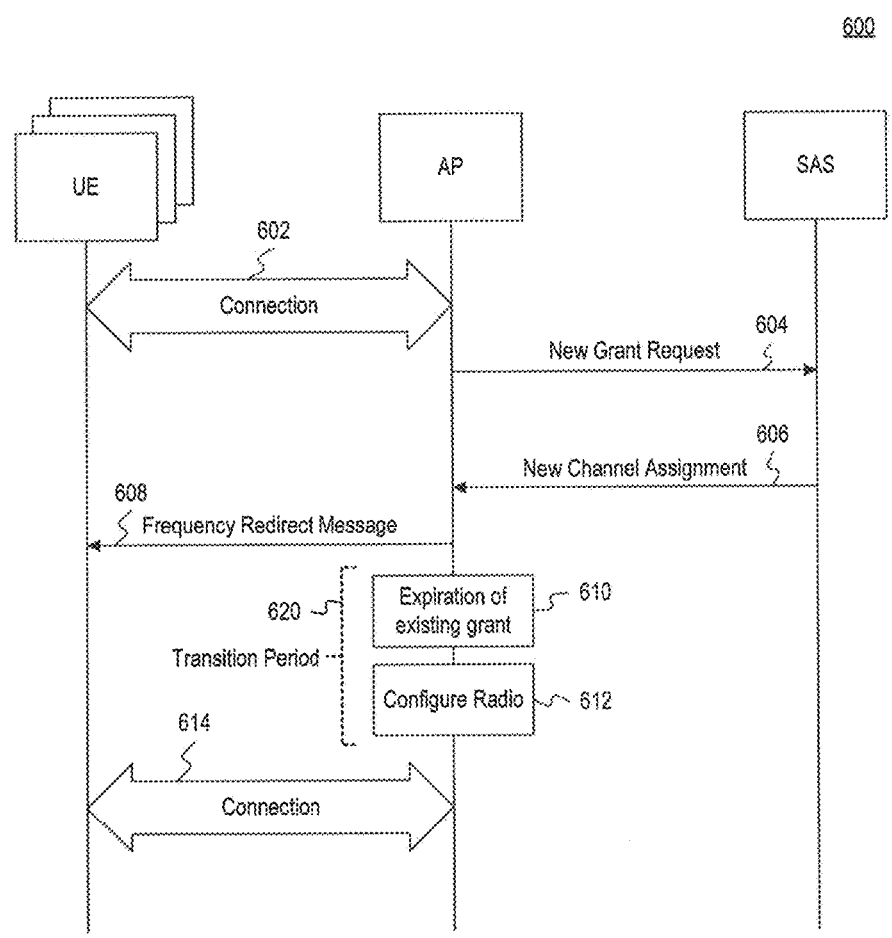
FIG. 6 is a flow diagram illustrating an exemplary sequence of steps that may be performed for switching the frequency of a connection between a user equipment and an access point in accordance with the disclosed embodiments.

FIG. 6 is a flow diagram illustrating an exemplary sequence of steps that may be performed in the disclosed embodiments. The process of FIG. 6 may be implemented in software, hardware, or any combination thereof. For purposes of explanation and not limitation, the process 600 will be described in the context of system 200, such that the disclosed process may be performed by software executing in the SAS 202, AP 212, and/or AS 214.

As shown in FIG. 6, the AP 212 and the UEs may have existing active connections 602. These active connections 602 may continue until the expiration of the existing grant at step 610. In order to facilitate a smooth transition to the next channel assignment, in some embodiments the AP 212 may send a new grant request 604 to the SAS 202 before the existing grant period expires for the AP's currently-allocated channels. In such embodiments, the AP 212 may determine the amount of time the SAS 102 needs to assign a new frequency-channel grant and the amount of time the AP 212 needs to transition to a new frequency channel after receiving a new grant. To minimize any disruption to the active connections 602, the AP 212 may send the grant request 604 to ensure adequate time for both the SAS 202 and AP 212.

In a dynamic spectrum allocation system, however, the SAS 202 may not be able to process an AP's request for new frequency-channel allocations too much in advance of the expiration of the existing channel grant. Because the SAS 202 dynamically assigns frequency channels, the SAS 202 may need to wait until closer to the end of the existing grant before assessing which frequency channels may be available to grant to the AP 212. For example, the period between the AP 212 sending the new grant request 604 and the beginning of its transition period at step 610 may be relatively short. Alternatively, there may be situations where the SAS 202 can determine the new frequency-channel allocations well in advance of the existing grant expiring, for example, if the deployment has a preferential scheme such as discussed above. In such an example, the SAS 202 may be able to determine the new frequency assignment based on the scheme. Yet other deployments of system 200 may have a more static nature for channel assignments. For example, if the deployment area is not crowded with IA, PA, or GAA devices, the SAS 202 may not need to reassign frequencies often.

After receiving the new grant request 604, the SAS 202 may return a new channel assignment 606 to the AP 212. The AP 212, after receiving the new channel assignment 606, may select a suitable frequency channel from among the channels in channel assignment 606 to use during the next grant period in accordance with the disclosed embodiments. In preparation for the transition to the new frequency channel, the AP 212 may preemptively send frequency redirect messages 608 to the UEs (e.g., one for each UE) before the start of a transition period 620. The transition period is the period where the AP 212 performs steps to switch to the new frequency channel, such as configuring one or more radio transmitters and receivers to communicate over the new frequency channel. During this transition period 620, the current grant may expire (step 610) before the AP 212 configures its radio to the new frequency channel, or vice versa. In some embodiments, the AP 212 may send the frequency redirect messages 608 to UEs with active connections 602 and to any UEs in idle mode.

In some disclosed embodiments using LTE, the AP 212 may send the frequency redirect message using a RRC-Reconfiguration message. In LTE, the RRC-Reconfiguration message may be used for connection establishment and release functions as well as in a handover procedure. In such embodiments, the RRC-Reconfiguration message may contain an indicator of the new channel assignment 606. In some exemplary embodiments, the AP 212 may use the Mobility Control Information Element in the RRC-Reconfiguration message to indicate the new channel assignment 606. Thus, the AP 212, while terminating the active connection at step 610, may use the RRC-Reconfiguration message to notify the UEs to start searching for the new frequency. Similar steps can also be taken for UEs in idle mode.

In some disclosed embodiments using LTE, the AP 212 may also send the frequency redirect message using a RRC-Connection-Release message. In such embodiments, the RRC-Connection-Release message may contain an indicator of the new channel assignment 606. Furthermore, the RRC-Connection-Release message may also enable the frequencies be provided based on a determined priority list. The disclosed embodiments are not limited to the exemplary techniques or messages described herein, and other suitable messages may also be used consistent with the disclosed embodiments.

In a further aspect of the disclosed embodiments, the AP 212 may determine the timing for sending out the frequency redirect messages 608 by estimating the amount of time it needs for the transition 620. In this manner, the AP 212 may send the frequency redirect messages 608 prior to the transition period 620 to ensure that the UEs have sufficient time to find the new frequency quickly and smoothly. During the transition period 620, the AP 212 may configure its radio to the new frequency at step 612. The exact timing may depend on the new channel assignment 608 from the SAS 102. In some embodiments, the new grant may coincide with the expiration of the current grant. In some embodiments, the SAS 202 may stagger the transition based on the existing needs of the system 200 and/or potential conflicts between IA, PA, and GAA devices. During the transition period, the UEs may be looking for transmissions from the AP 212 over the new frequency channel. Thus, after the AP 212 configures its radio to the new frequency channel, new connections 614 using the new frequency channel may be immediately established with each UE and the previous connections 602 may be discontinued.

In some embodiments, the frequency redirect messages 608 may also include a set of one or more timers with different epochs to indicate when the UEs should use the new frequency channel. In such embodiments, each timer or epoch may be associated with a frequency channel to enable the UEs to establish the new connections 614 at the appropriate time.

Figure 7:
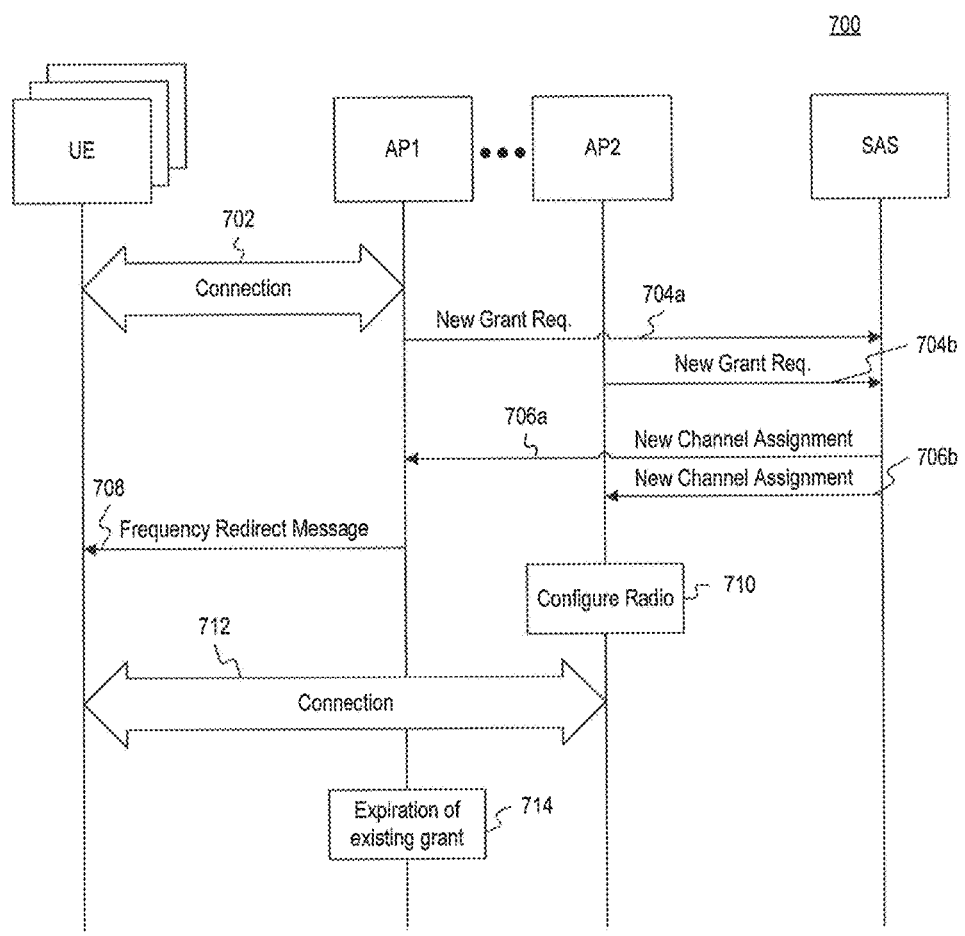
FIG. 7 is a flow diagram illustrating an exemplary sequence of steps that may be performed for switching the frequency of a connection using multiple access points in accordance with the disclosed embodiments.

FIG. 7 is a flow diagram illustrating an exemplary sequence of steps that may be performed in accordance with the disclosed embodiments. The process of FIG. 7 may be implemented in software, hardware, or any combination thereof. For purposes of explanation and not limitation, the process 700 will be described in the context of system 200, such that the disclosed process may be performed by software executing in the SAS 202, AP 212, and/or AS 214.

In some embodiments, the system 200 may have one or more access points. In such embodiments, the SAS 202 may use the multi-AP deployment to ensure a smooth transition of frequency channels used for connections between APs and ASs and UEs. For example, after the SAS assigns a new frequency channel to an AP, such that the UEs communicating with that AP need to change to a different frequency channel, the AP's connections to one or more of the UEs may be handed off to another AP that uses a different frequency channel.

FIG. 7 illustrates an exemplary system including at least AP1 and AP2, SAS 202, and multiple UEs. For purposes of explanation and not limitation, FIG. 7 shows active connections 702 between the UEs and AP1; however, AP2 may also have active connections with one or more UEs in the system 200.

In this exemplary embodiment, AP1 and AP2 respectively may send new grant requests 704*a*, 704*b* to the SAS 202 before the existing grant of AP1 expires at step 714. The SAS 202 may recognize that AP2 may be available to help transition the UEs connected to AP1 to a new channel allocation. For example, AP2 may be covering the same coverage area as AP1. As part of its channel allocation, the SAS 202 may choose to stagger the frequencies used on AP1 and AP2 to ensure the new frequency channel may be available on AP2 at step 710 (when AP2 configures its radio for the new frequency channel) before the current grant of AP1 expires at step 714.

In another aspect, the SAS 202 may monitor the activities of the APs in the system 200. For example, AP1 may be loaded with a large number of active connections to UEs, and other APs in the system 200, such as AP2, may be less loaded with fewer active connections. In such an example, the SAS 202 may minimize the number of UEs affected by the transition by ensuring the UEs on the highly-loaded AP1 may transition to the new frequency channel on AP2. Thus, when AP1 sends a new grant request 704*a* to the SAS 202 seeking a new frequency-channel allocation, the SAS 202 may send a new channel assignment 706*a* to AP1 and also send a new channel assignments to the less-heavily loaded AP2. For example, the SAS 202 may send a new channel assignment 706*b* to AP2 without having received a new grant request 704*b* from AP2. Similar channel transitions between APs may be made for APs that need to quickly change frequencies because of emergency or high-priority calls.

Using the new channel assignments 706*a*, 706*b*, the SAS 202 may stagger the frequency switching on the two APs. For example, the SAS 202 may transmit to AP1 a new channel assignment 706*a*. The new channel assignment 706*a* for AP1 may include the new frequency allocation, and it may also indicate that the new grant will begin after the expiration of the existing grant. By setting the new grant to begin after the current grant expires, AP1 may continue to transmit using its current channel all the way up to the expiration point 714. To AP2, the SAS 202 may transmit a new channel assignment 706*b*. In order to stagger the transition, the new channel assignment 706*b* for AP2, for example, may include the same frequency allocation but indicate a start time for using the new frequency channel before AP1's current grant expires. Thus, AP2 may configure its radio at step 710 before the expiration of AP1's current grant at step 714.

In a further aspect of the disclosed embodiments, AP1 may transmit frequency redirect messages 708 to the UEs. The frequency redirect messages 708 may include information relating to the new frequency channel. The messages 708 may also include information related to the neighbor relations. The UEs, after receiving the frequency redirect messages 708, may start searching for whether the new frequency is currently being used on any of the other APs in the system 200. If the UEs find the new frequency at a different AP, for example AP2, they may establish a new active connection 712 with AP2 and terminate their connection 702 with AP1 before the grant for the current frequency channel expires at step 714. Although not shown in FIG. 7, AP2 also may use frequency redirect messages to notify its active UEs to switch frequency, such as shown in FIG. 6.

Figure 8:
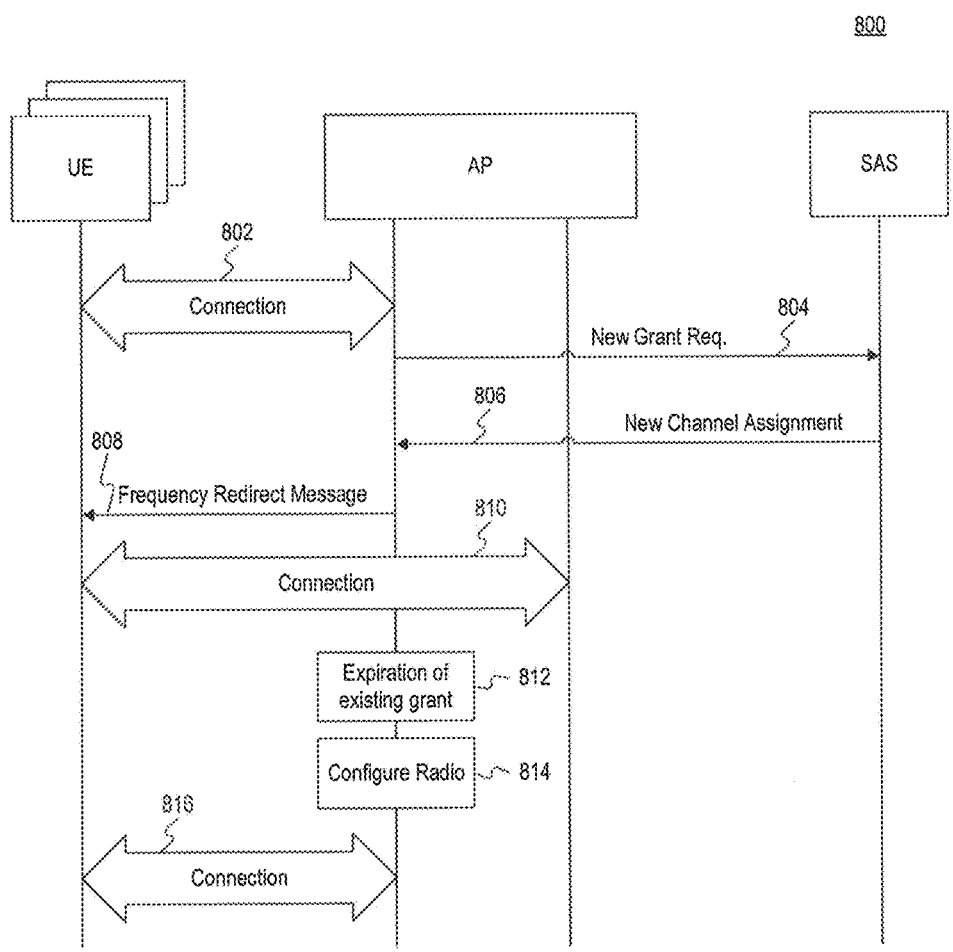
FIG. 8 is a flow diagram illustrating an exemplary sequence of steps that may be performed for switching the frequency of a connection using multiple radios in accordance with the disclosed embodiments.

FIG. 8 is a flow diagram illustrating an exemplary sequence of steps that may be performed for switching frequency channels using multiple radios in accordance with the disclosed embodiments. The process of FIG. 8 may be implemented in software, hardware, or any combination thereof. For purposes of explanation and not limitation, the process 800 will be described in the context of system 200, such that the disclosed process may be performed by software executing in the SAS 202, AP 212, and/or AS 214.

In some embodiments, the AP 212 and/or the AS 214 may comprise APs that have multiple radios that can transmit and receive different frequencies at the same time. In such embodiments, the APs may use the multiple radios to ensure a smooth transition of frequencies. For example, the new frequency channel may be made available on one of the radios before the transition period, so that the new frequency channel may be available without any delay to the UEs. As shown in FIG. 8, the AP 212 may have multiple radios (e.g., each vertical line below "AP" represents use of a different radio in the same AP), For purposes of explanation and not limitation, FIG. 8 shows the UEs having active connections 802 with one of the radios in the AP 212. It is to be understood that the AP 212 may also have active connections with one or more UEs on the other radio as well.

Similar to exemplary process 700, the AP 212 may stagger the frequency switching on one of its radios to ensure that a new frequency channel may be available before the expiration of the SAS's channel grant for an existing frequency channel, at step 812. The process may begin with AP 212 sending a new grant request 804 to the SAS 202. Based on the needs of the system 200 and/or various optimization criteria, the SAS 202 may send a new channel assignment 806 to the AP 212.

In this illustrative embodiment, the AP 212 may determine the most suitable method to transition the UEs to the new frequency. In one embodiment, the AP 212 may determine that one of its radios may be lightly loaded. The AP 212 may send frequency redirect messages 808 to the UEs communicating with the AP on its higher loaded radio, so those UEs may temporary switch their connections to the other radio in the AP. The AP transitions the connections 802 from the higher-loaded radio to connections 810 on the more lightly loaded radio, and may further reconfigure the higher-loaded radio to the new frequency at step 814. Then the AP 212 may follow the same process to redirect the UEs back to the original radio, thereby transitioning the UE connections 810 back to the original radio and establishing new connections 816 on the original radio using a new frequency allocation.

In another exemplary embodiment, the transition from one radio to the other radio may be nearly simultaneous. In such an embodiment, the AP 212 may stop transmitting on one of its radios and attempt to simultaneously (or nearly simultaneously) activate the new frequency channel on another radio. Thus, the AP 212 may be able to switch to the new frequency without any substantial gap in time.

In some embodiments, the AP 212 may have multiple radios for different wireless communication technologies. For example, the AP 212 may have separate radios for CBRS (e.g., 3.5 GHz) and MAN (e.g., 2.4 GHz and 5 GHz) communications. In such embodiments, the AP 212 may preemptively transition the UEs on active connections 802 from a frequency on a CBRS-configured radio to a different radio configured to communicate using a WLAN frequency, or vice versa. Thus, from a user-experience perspective, there is no substantial disruption or intermission in transitioning the UE connections between different radios configured to communicate using different wireless technologies. Other coordinated deployments may also be possible. For example, the AP may have integrated small cell capabilities, Bluetooth, NFC, or the like.

Figure 9:
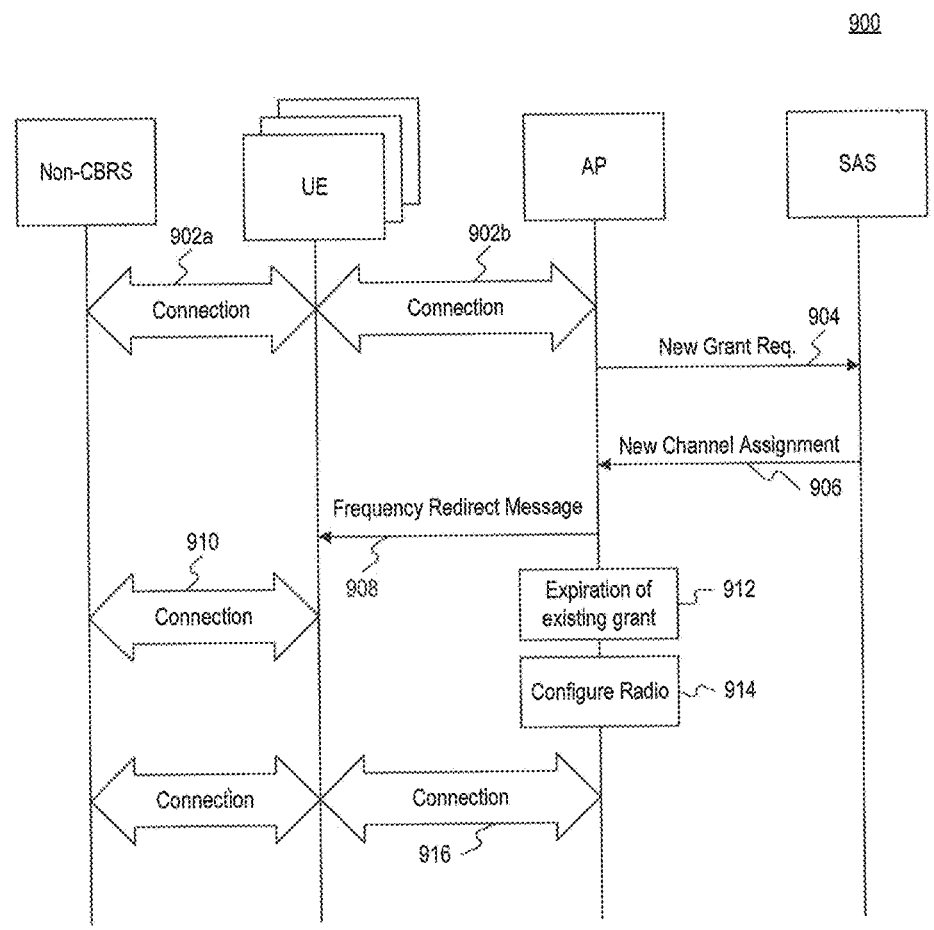
FIG. 9 is a flow diagram illustrating an exemplary sequence of steps that may be performed for switching the frequency of a connection using a multi-context user equipment in accordance with the disclosed embodiments.

FIG. 9 is a flow diagram illustrating an exemplary sequence of steps that may be performed for switching frequencies with dual-context UEs in accordance with the disclosed embodiments. A dual-context UE may establish concurrent connections with different types of wireless systems, such as with APs configured to communicate using CBRS and WLAN or other non-CBRS frequencies. The process of FIG. 9 may be implemented in software, hardware, or any combination thereof. For purposes of explanation and not limitation, the process 900 will be described in the context of system 200, such that the disclosed process may be performed by software executing in the SAS 202, AP 212, and/or AS 214.

In some embodiments, the UEs may have the capability to maintain one or more communication contexts, including for example state information, associated with concurrent connections with APs in different types of wireless networks. For example, the UEs may have multiple radios to simultaneously establish connections to multiple wireless networks and can maintain separate contexts for each of those networks. As shown in FIG. 9, for example, the UEs may be able to maintain a connection 902a with a non-CBRS wireless access point and a connection 902b with the AP 212. For purposes of explanation and not limitation, FIG. 9 shows the UEs maintaining an active connection with a non-CBRS. It is to be understood that the UEs may maintain multiple active connections with any wireless networks and any wireless technologies.

In the disclosed embodiments of FIG. 9, the AP 212 may leverage use of the UE's non-CBRS connection to coordinate the transition to a new frequency channel. In one aspect, for example, the AP 212 may use frequency redirect messages 908 to preemptively transition the UEs to direct all their data flows to the non-CBRS connections 910. In one example, the UEs may be connected simultaneously to the AP over a frequency channel in the 3.5 GHz CBRS band and also connected to a base station in a macro cellular network or otherwise may have access to macro cellular network coverage. In this example, the AP 212 may redirect the UE connections 902b to the macro cellular network during its transition period. In this manner, the UEs may maintain a connection 910, which combines the connections 902a and connections 902b, before and/or during the transition period of AP 212 to a new frequency channel, which the AP begins when its existing frequency-channel grant expires at step 912. The AP 212 configures its radio to the new frequency channel at step 914. The AP may send another frequency redirect message (not shown) so the UEs may be redirected back to the AP 212 to establish a connection 916 over the new frequency channel, after which the UEs again maintain separate connections to the AP and non-CBRS access points. In this way, the AP 212 may be able to switch frequencies without creating any significant disruption from a user-experience perspective.

Figure 10:
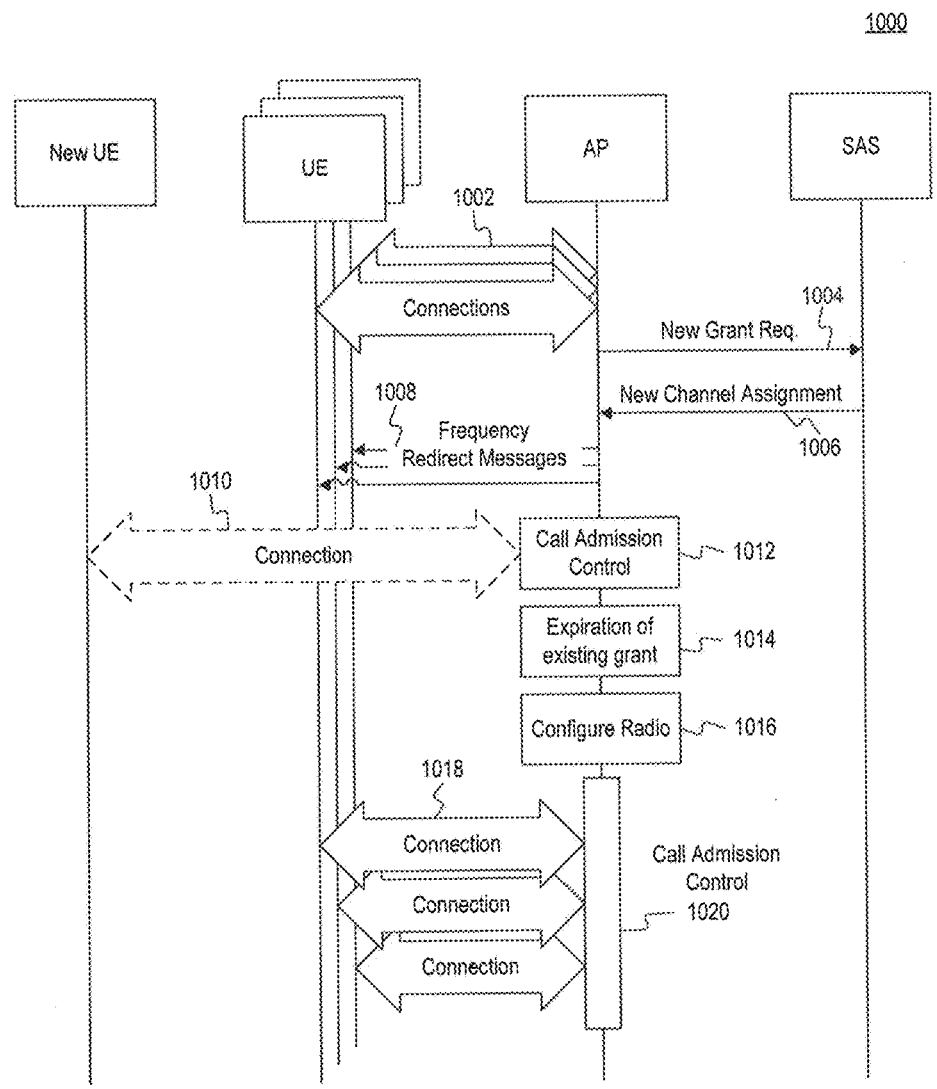
FIG. 10 is a flow diagram illustrating an exemplary sequence of steps that may be performed for switching the frequency of a connection using call admission control of an attempted new connection in accordance with the disclosed embodiments.

FIG. 10 is a flow diagram illustrating an exemplary sequence of steps that may be performed using call admission control in accordance with the disclosed embodiments. The process of FIG. 10 may be implemented in software, hardware, or any combination thereof. For purposes of explanation and not limitation, the process 1000 will be described in the context of system 200, such that the disclosed process may be performed by software executing in the SAS 202, AP 212, and/or AS 214.

In these disclosed embodiments, the AP 212 may use call admission control to selectively establish connections with UEs before and after the transition period. As shown in FIG. 10, the AP may have established UE connections 1002 and may send a grant request 1004 to request an updated set of frequency assignments from the SAS. In response, the SAS returns a new channel assignment message 1006 and the AP may send frequency redirect messages to the UEs as previous discussed.

The system 200 also may include at least one "new" UE that is not currently connected to any APs. If the new UEs attempts to establish a connection with the AP close in time to when the AP's existing grant expires at step 1014, for example, the AP's call admission control may reject the requested new connection if the frequency redirect messages 1008 were sent to existing UEs before the new UE attempted to establish a new connection. The AP 212 may use call admission control prior to the transition period (starting at step 1014) to prevent the attempted new connection 1010 from being established.

For example, the new UE may send a new connection request to the AP 212 at step 1012. But because the AP 212 may be transitioning to the new frequency channel, the AP's call admission control may deny the new connection request. In some aspects, the call admission control 1012 may allow such new connection request under certain circumstances. For example, the new connection request may be a high priority connection request, an emergency connection request, or the like, which the call admission control procedure would permit the AP to establish at step 1012.

In a further aspect, the call admission control may be used after the transition period, e.g., after the radio is configured to the new frequency at step 1016. As shown in FIG. 10, the AP 212 may be highly loaded with multiple active connections 1002. After the transition period at step 1016, the AP 212 may receive multiple connection requests from the UEs. The AP 212 may use call admission control during this period 1020 to selectively establish new connections 1018 with the UEs using the new frequency. In some aspects, the AP 212 may use its call admission control procedure to ensure that the connections 1018 are made based on priority. For example, the AP 212 may establish the connections 1018 so that high-priority requests are connected first. Alternatively, the connections may be established based on the QoS requirements of the AP 212 and/or UEs.

Figure 11:
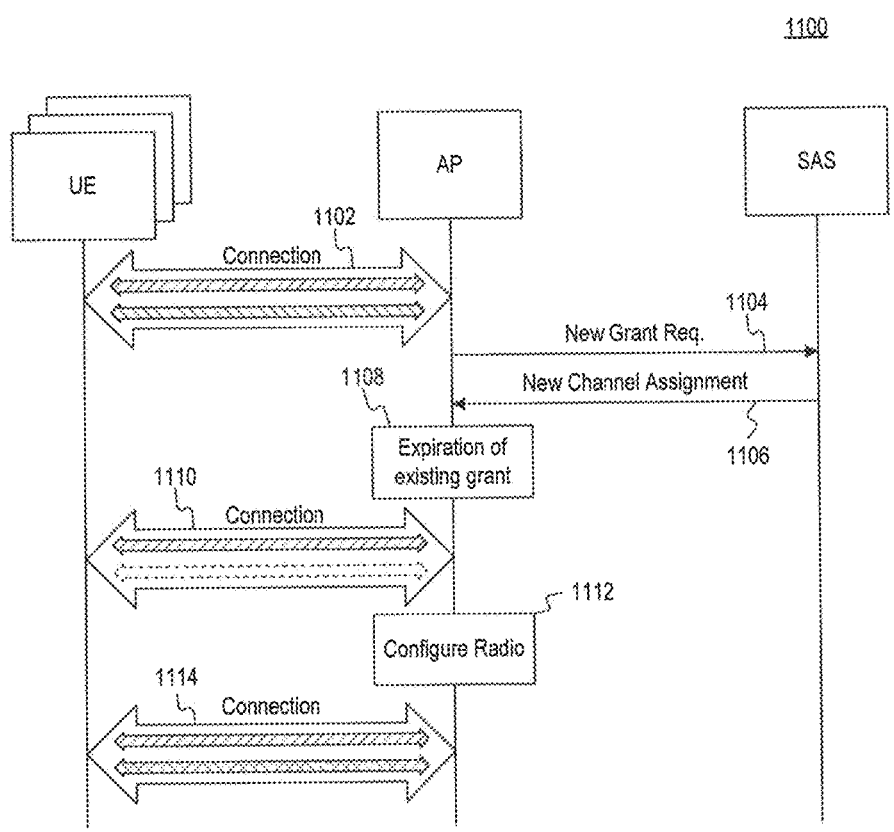
FIG. 11 is a flow diagram illustrating an exemplary sequence of steps that may be performed for switching a frequency in a multi-carrier connection in accordance with the disclosed embodiments.
Figure 12:
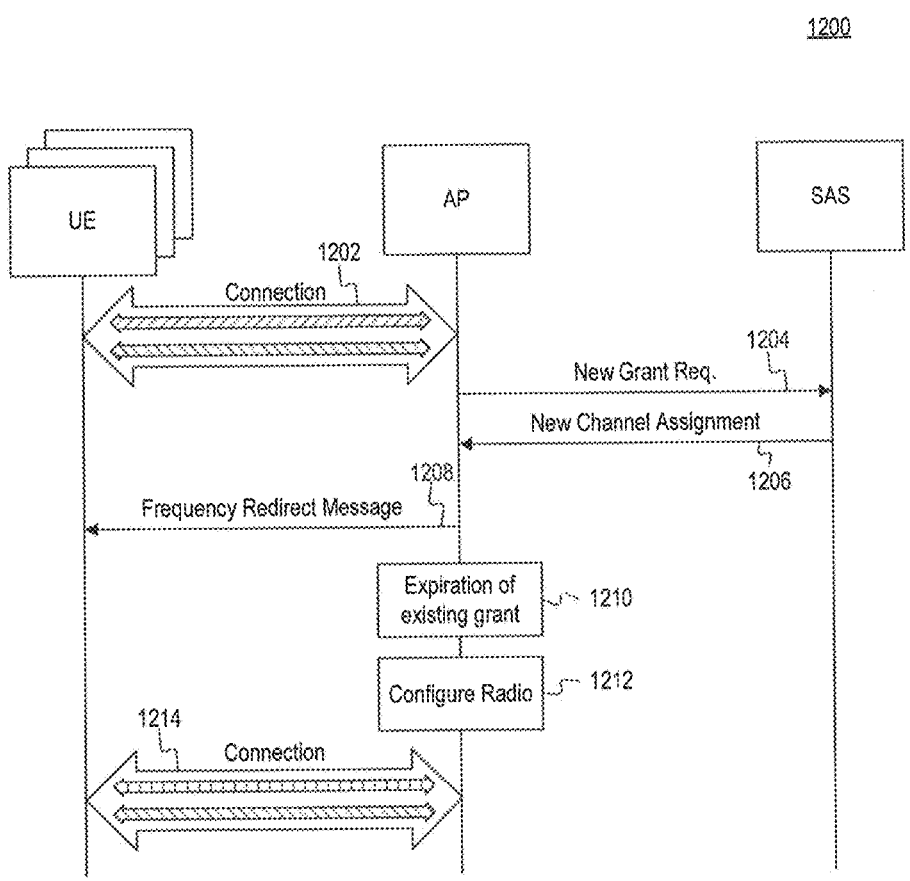
FIG. 12 is a flow diagram illustrating another exemplary sequence of steps that may be performed for switching a frequency in a multi-carrier connection in accordance with the disclosed embodiments.

FIGS. 11 and 12 are flow diagrams illustrating exemplary sequences of steps that may be performed for switching frequencies using carrier aggregated connections in accordance with the disclosed embodiments. The exemplary processes shown in FIGS. 11 and 12 may be implemented in software, hardware, or any combination thereof. For purposes of explanation and not limitation, the processes 1100 and 1200 will be described in the context of system 200, such that the disclosed processes may be performed by software executing in the SAS 202, AP 212, and/or AS 214.

In some embodiments, the APs in the system 200 may have the capability to simultaneously use multiple frequency channels for communicating with UEs. For example, in LTE, the APs may be able to aggregate one or more carriers during transmission. As shown in FIGS. 11 and 12, the connections 1102, 1202 between the AP 212 and the UEs may comprise multiple carrier channels, each at a different frequency. Furthermore, these "aggregated" frequency channels within a single connection may be separated into primary channels and secondary channels.

In some instances, the SAS 202 may request the AP 212 to switch only a subset of the frequencies that are currently active. In such instances, the AP 212 may have different options depending on which channels should be switched. FIG. 11 shows an exemplary sequence of steps that may be performed to switch the frequencies of secondary channels in the connections 1102, 1202. In FIG. 11, the SAS 202 may send a new channel assignment 1106 in response to a new grant request 1104. The new channel assignment may include a list of available frequencies for the next grant period. The AP 212 may determine that only a subset of the frequencies that are currently active needs to be switched. Further, the AP 212 may determine that only the secondary channels should have their frequencies changed. During the transition period starting when the existing channel grant expires at step 1108, the AP 212 may maintain the primary channels in connection 1110, but discontinue at least one secondary channel in the connection. At step 1112, the AP 212 may configure the radio to transmit using the new frequency for the secondary channels. After the secondary channels are reestablished at the new frequency, the connection 1114 may again comprise both primary and secondary channels. Thus any disruption to the transmission may be limited to only the secondary channels.

FIG. 12 shows an exemplary sequence of steps that may be performed to switch the frequencies of the primary channels in a connection. Similar to FIG. 11, the SAS 202 may send a new channel assignment 1206 in response to a new grant request 1204. The new channel assignment, however, may require the primary channels to be switched to a different frequency. In such a case, the AP 212 may have multiple options to switch the primary channels. In some embodiments, the AP 212 may send a frequency redirect message 1208 to the UEs in accordance with the disclosed embodiments discussed previously, so the UEs may redirect their transmissions using a new frequency. The frequency redirect message may redirect the UEs based on any of the disclosed embodiments depending on the specific deployment within the system 200. In some embodiment, for example in LTE, the AP 212 may use load balancing techniques to temporary transfer the UEs on the primary channels to the secondary channels. This may allow the AP 212 to transition the frequency for the primary channels with minimal disruptions to the transmission. After the transition is complete, the connection 1214 may be established for all the affected UEs.

FIG. 13 is a flow diagram illustrating an exemplary sequence of steps that may be performed for switching spectrum based on specific events in accordance with the disclosed embodiments. The process of FIG. 13 may be implemented in software, hardware, or any combination thereof. For purposes of explanation and not limitation, the process 1300 will be described in the context of system 200, such that the disclosed process may be performed by software executing in the SAS 202, AP 212, and/or AS 214.

In the foregoing disclosed embodiments, the SAS 202 generally may wait for a grant request message before transmitting a new channel assignment message to the AP 212. In some embodiments, however, the SAS 202 may transmit a new channel assignment without having previously received a grant request message from the AP. As shown in FIG. 13, the UEs and AP 212 may have active connections 1302, but an event may arise at step 1304. The event, for example, may be an emergency due to sudden needs of IA and/or PAL users. For example, the military (e.g., a Federal incumbent user), commercial satellite services (e.g. a non-Federal incumbent user), and/or the emergency response services (e.g., PAL users) may suddenly require additional bandwidth. Alternatively, the SAS 202 may dynamically allocate additional resources to certain APs based on the overall load of the system 200, the current needs of the APs, QoS requirements, and/or other optimization reasons. In such embodiments, the SAS 202 may transmit a new channel assignment 1306 to the AP 112 without having received a prior grant request from the AP 112. The AP 112, after receiving the new grant assignment 1306, may transmit frequency redirect messages 1308 to the UEs, reconfigure its radio (step 1310), and establish new connections 1312 using the newly granted frequency, in accordance with the disclosed embodiments. Persons of ordinary skill in the art will appreciate that the exemplary process 1300 described herein may be applicable to any of the disclosed embodiments.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. It is to be understood that the examples and descriptions in this disclosure have been arbitrarily defined herein for the convenience of the description. The disclosed systems and methods are not limited to these simplified examples, and other features and characteristics may be considered so long as the specified functions are appropriately performed.

While certain exemplary embodiments have been discussed with respect to CBRS and/or LTE for purposes of discussion and explanation, persons skilled in the art will appreciate the useful applications of the disclosed methods, systems, and apparatuses for switching frequencies in a dynamic spectrum allocation system. Moreover, although aspects of the disclosed embodiments are described as being associated with data stored in memory and other tangible computer-readable storage mediums, one skilled in the art will appreciate that these aspects can be stored on and executed from many types of tangible computer-readable media. Further, certain processes and steps of the disclosed embodiments are described in a particular order, one skilled in the art will appreciate that practice of the disclosed embodiments are not so limited and could be accomplished in many ways. Accordingly, the disclosed embodiments are not limited to the above-described examples, but instead are defined by the appended claims in light of their full scope of equivalents.

What is claimed is:

1. A method for switching frequencies using an access device in a wireless access system, the method comprising:
   selecting an initial frequency channel that the access device may use to communicate with one or more user equipments (UEs) before the access device receives its first frequency channel allocation;
   establishing a connection between the access device and the one or more UEs based on the initial frequency channel;
   transmitting a request to a spectrum access system (SAS) for allocation of at least one frequency channel that the access device may use to communicate with the one or more UEs;
   receiving, from the SAS, the allocation of the at least one frequency channel that the access device may use to communicate with the one or more UEs;
   transmitting a message to the one or more UEs indicating the at least one allocated frequency channel;
   configuring a radio in the access device to operate using the at least one allocated frequency channel;
   establishing the connection between the access device and the one or more UEs based on the at least one allocated frequency channel;
   detecting at least one of a presence or an activity of an incumbent user; and
   switching, in response to detecting at least one of a presence or an activity of an incumbent user, the connection between the access device and the one or more UEs from the at least one allocated frequency channel to a new frequency channel, wherein the one or more UEs are configured to communicate over the new frequency channel.

2. The method of claim 1, further comprising determining one or more frequency channels from among the at least one allocated frequency channel for establishing the connection between the access device and the one or more UEs.

3. The method of claim 1, wherein the message is transmitted to the one or more UEs prior to configuring the radio in the access device.

4. The method of claim 1, wherein the message directs the one or more UEs to temporarily discontinue at least one existing connection with the access device during a time period when the radio in the access device is being configured.

5. The method of claim 1, wherein the wireless access system comprises a Long Term Evolution (LTE) network.

6. The method of claim 5, wherein the message transmitted to the one or more UEs is formatted in accordance with a RRC-Reconfiguration message in the LTE standard.

7. The method of claim 5, wherein the message transmitted to the one or more UEs is formatted in accordance with a RRC-Connection-Release message in the LTE standard.

8. The method of claim 1, wherein the step of configuring the radio further comprises configuring both a transmitter and a receiver in the radio to operate using the at least one allocated frequency channel.

9. The method of claim 1, wherein selecting the initial frequency channel further comprises selecting a predetermined frequency channel.

10. The method of claim 1, wherein selecting the initial frequency channel further comprises assessing one or more allocated frequency channels of neighboring access devices to determine the initial frequency channel.

11. The method of claim 1, further comprising permitting limited types of transmissions between the access device and the one or more UEs using the initial frequency channel.

12. The method of claim 11, wherein the limited types of transmissions comprise communications for emergency services.

13. The method of claim 1, wherein the at least one allocated frequency channel is based on an optimization criteria.

14. The method of claim 1, further comprising sending a request for a new allocated frequency channel before an expiration of a grant period associated with the at least one allocated frequency channel.

15. The method of claim 14, further comprising sending a redirect message to the one or more UEs before transitioning to the new allocated frequency channel.

16. The method of claim 1, wherein the at least one allocated frequency channel is based on usage requirements of at least one of incumbent access, priority access, or general authorized access devices.

17. An access device, comprising:
   a radio comprising:
      a receiver configured to receive, from a spectrum access system (SAS), an allocation of at least one frequency channel that the access device may use to communicate with one or more user equipments (UEs) in a wireless access system; and
      a transmitter configured to:
         transmit a request to the SAS for allocation of the at least one frequency channel that the access device may use to communicate with the one or more UEs; and
         transmit a message to the one or more UEs indicating the at least one allocated frequency channel;
   at least one processor;
   a memory storing instructions for execution by the at least one processor, wherein the at least one processor is configured to execute the stored instructions to:
      select an initial frequency channel that the access device may use to communicate with the one or more UEs before the access device receives its first frequency channel allocation;
establish a connection between the access device and the one or more UEs based on the initial frequency channel;
configure the radio to transmit using the at least one allocated frequency channel;
establish the connection between the access device and the one or more UEs based on the at least one allocated frequency channel;
detect at least one of a presence or an activity of an incumbent user; and
switch, in response to detecting at least one of a presence or an activity of an incumbent user, the connection between the access device and the one or more UEs from the at least one allocated frequency channel to a new frequency channel, wherein the one or more UEs are configured to communicate over the new frequency channel.

18. The access device of claim 17, wherein the at least one processor is further configured to determine one of more frequency channels from among the at least one allocated frequency channel for establishing the connection between the access device and the one or more UEs.

19. The access device of claim 17, wherein the message is transmitted to the one or more UEs prior to configuring the radio in the access device.

20. The access device of claim 17, wherein the message directs the one or more UEs to temporarily discontinue at least one existing connection with the access device during a time period when the radio in the access device is being configured.

21. The access device of claim 17, wherein the wireless access system comprises a Long Term Evolution (LTE) network.

22. The access device of claim 21, wherein the message transmitted to the one or more UEs is formatted in accordance with a RRC-Reconfiguration message in the LTE standard.

23. The access device of claim 21, wherein the message transmitted to the one or more UEs is formatted in accordance with a RRC-Connection-Release message in the LTE standard.

24. The access device of claim 17, wherein the at least one processor is further configured to execute the stored instructions to select the initial frequency channel based on a predetermined frequency channel.

25. The access device of claim 17, wherein the at least one processor is further configured to execute the stored instructions to determine the initial frequency channel based on assessing one or more allocated frequency channels of neighboring access devices.

26. The access device of claim 17, wherein the at least one processor is further configured to execute the stored instructions to permit limited types of transmissions between the access device and the one or more UEs using the initial frequency channel.

27. The access device of claim 26, wherein the limited types of transmissions comprise communications for emergency services.

28. The access device of claim 17, wherein the at least one allocated frequency channel is based on an optimization criteria.

29. The access device of claim 17, wherein the at least one processor is further configured to execute the stored instructions to send a request for a new allocated frequency channel before an expiration of a grant period associated with the at least one allocated frequency channel.

30. The access device of claim 29, wherein the at least one processor is further configured to execute the stored instructions to send a redirect message to the one or more UEs before transitioning to the new allocated frequency channel.

31. The access device of claim 17, wherein the at least one allocated frequency channel is based on usage requirements of at least one of incumbent access, priority access, or general authorized access devices.

32. A non-transitory computer readable medium storing instructions that, when executed by at least one processor in an access device cause the access device to perform a method comprising steps of:
selecting an initial frequency channel that the access device may use to communicate with one or more user equipments (UEs) before the access device receives its first frequency channel allocation;
establishing a connection between the access device and the one or more UEs based on the initial frequency channel;
transmitting a request to a spectrum access system (SAS) for allocation of at least one frequency channel that the access device may use to communicate with the one or more UEs;
receiving, from the SAS, the allocation of the at least one frequency channel that the access device may use to communicate with the one or more UEs;
transmitting a message to the one or more UEs indicating the at least one allocated frequency channel;
configuring a radio in the access device to operate using the at least one allocated frequency channel;
establishing a connection between the access device and the one or more UEs based on the at least one allocated frequency channel;
detecting at least one of a presence or an activity of an incumbent user; and
switching, in response to detecting at least one of a presence or an activity of an incumbent user, the connection between the access device and the one or more UEs from the at least one allocated frequency channel to a new frequency channel, wherein the one or more UEs are configured to communicate over the new frequency channel.

33. The media of claim 32, wherein execution of the instructions by the at least one processor further causes the access device to determine one or more frequency channels from among the at least one allocated frequency channel for establishing the connection between the access device and the one or more UEs.

34. The media of claim 32, wherein the message is transmitted to the one or more UEs prior to configuring the radio in the access device.

35. The media of claim 32, wherein the message further directs the one or more UEs to temporarily discontinue at least one existing connection with the access device during a time period when the radio in the access device is being configured.

36. The media of claim 32, wherein the wireless access system comprises a Long Term Evolution (LTE) network.

37. The media of claim 36, wherein the message transmitted to the one or more UEs is formatted in accordance with a RRC-Reconfiguration message in the LTE standard.

38. The media of claim 36, wherein the message transmitted to the one or more UEs is formatted in accordance with a RRC-Connection-Release message in the LTE standard.

39. The media of claim 36, wherein the step of configuring the radio further comprises configuring both a transmitter and a receiver in the radio to operate using the at least one allocated frequency channel.

* * * * *